(12) United States Patent
Park et al.

(10) Patent No.: US 8,208,475 B2
(45) Date of Patent: Jun. 26, 2012

(54) PACKET SCHEDULER AND PACKET SCHEDULING METHOD

(75) Inventors: Ji-Soo Park, Daejeon (KR); Han-Jun Yoon, Daejeon (KR); Dong-jin Shin, Daejeon (KR); Cheol-Hye Cho, Daejeon (KR); Moon-Soo Jang, Daejeon (KR); Chang-Ki Kim, Daejeon (KR); Young-Jick Bahg, Daejon (KR)

(73) Assignees: Electronics and Telecommunications Research Institute, Daejeon (KR); Samsung Electronics Co., Ltd., Suwon-Si, Gyeonggi-Do (KR)

( * ) Notice: Subject to any disclaimer, the term of this patent is extended or adjusted under 35 U.S.C. 154(b) by 509 days.

(21) Appl. No.: 12/517,169

(22) PCT Filed: Nov. 30, 2007

(86) PCT No.: PCT/KR2007/006130
§ 371 (c)(1),
(2), (4) Date: Jun. 1, 2009

(87) PCT Pub. No.: WO2008/066345
PCT Pub. Date: Jun. 5, 2008

(65) Prior Publication Data
US 2010/0002632 A1    Jan. 7, 2010

(30) Foreign Application Priority Data

Dec. 1, 2006  (KR) .................. 10-2006-0120763
Jun. 19, 2007  (KR) .................. 10-2007-0059839

(51) Int. Cl.
*H04L 12/56* (2006.01)

(52) U.S. Cl. .................. 370/395.4; 370/508
(58) Field of Classification Search .................. 370/235, 370/236, 329, 395.4, 469, 508, 516
See application file for complete search history.

(56) References Cited

U.S. PATENT DOCUMENTS

| | | | |
|---|---|---|---|
| 6,175,568 B1 * | 1/2001 | Awdeh | 370/236.1 |
| 6,331,970 B1 * | 12/2001 | Nieh et al. | 370/230 |
| 6,532,213 B1 | 3/2003 | Chiussi et al. | |
| 6,563,829 B1 * | 5/2003 | Lyles et al. | 370/395.21 |
| 6,628,614 B2 * | 9/2003 | Okuyama et al. | 370/230.1 |
| 7,027,392 B2 | 4/2006 | Holtzman et al. | |

(Continued)

FOREIGN PATENT DOCUMENTS

KR     1020040051281     6/2004

(Continued)

OTHER PUBLICATIONS

Korean Office Action for Application No. 10-2007-0059839, dated Nov. 25, 2008.

(Continued)

*Primary Examiner* — Brian D Nguyen
(74) *Attorney, Agent, or Firm* — Nelson Mullins Riley & Scarborough LLP; EuiHoon Lee, Esq.

(57) ABSTRACT

A method for scheduling packets from a plurality of radio bearers by a scheduler of a first layer includes calculating a virtual scheduling time for the radio bearers by using a packet delay variation of the radio bearers, and transmitting the packet of the radio bearer having the greatest virtual scheduling time from among the plurality of radio bearers to a second layer.

18 Claims, 4 Drawing Sheets

U.S. PATENT DOCUMENTS

| | | | |
|---|---|---|---|
| 7,787,486 B2 * | 8/2010 | Vestal | 370/442 |
| 2004/0114516 A1 | 6/2004 | Iwata et al. | |
| 2004/0258099 A1 | 12/2004 | Scott et al. | |
| 2004/0267956 A1 | 12/2004 | Leon et al. | |
| 2005/0089054 A1 * | 4/2005 | Ciancaglini et al. | 370/412 |

FOREIGN PATENT DOCUMENTS

| | | |
|---|---|---|
| KR | 1020040081033 | 9/2004 |
| KR | 1020050102715 | 10/2005 |
| KR | 1020050117874 | 12/2005 |
| KR | 1020060011964 | 2/2006 |
| WO | WO-02/01821 A1 | 1/2002 |

OTHER PUBLICATIONS

International Search Report for Application No. PCT/KR2007/006130, dated Feb. 29, 2008.

Korean Office Action for Application No. 9-5-2008-059304858, dated Nov. 25, 2008.

* cited by examiner

[Fig. 1]
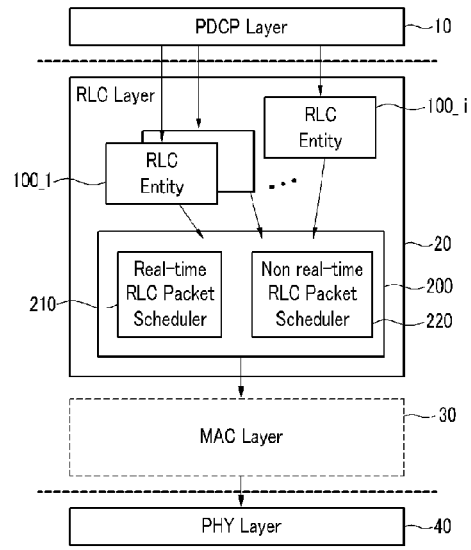
[Fig. 2]
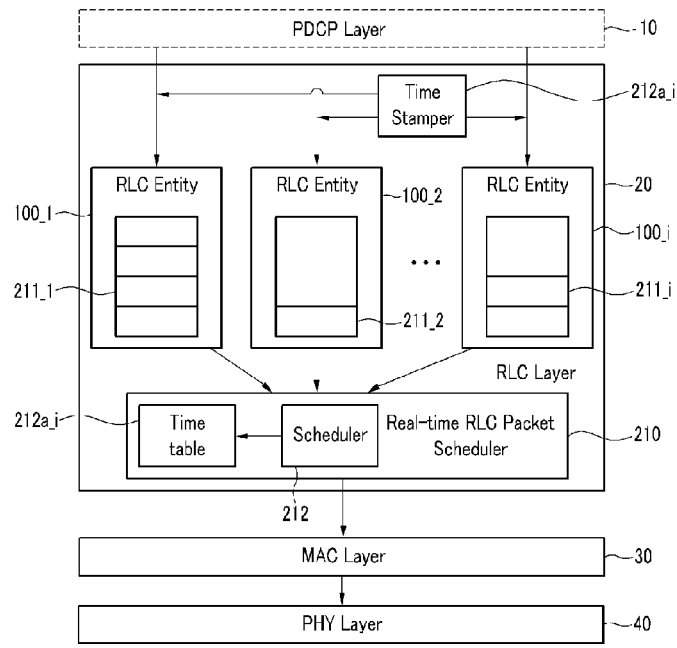
[Fig. 3]
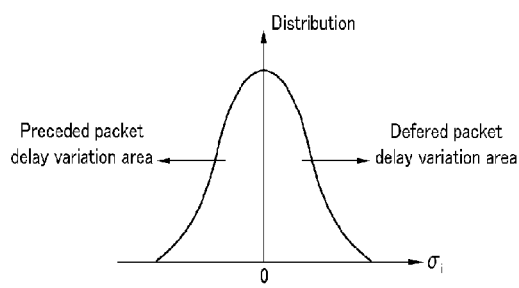

[Fig. 4]
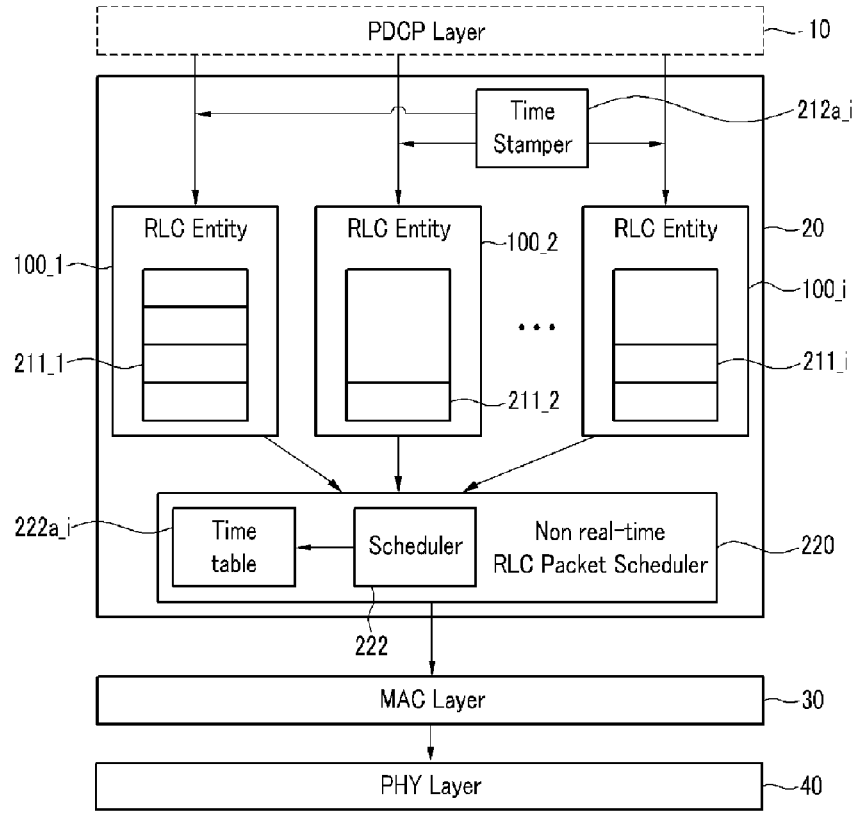
[Fig. 5]
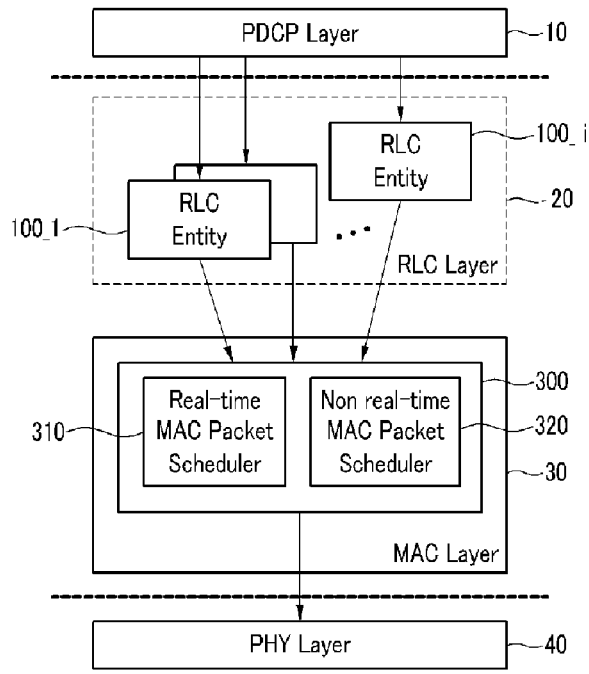

[Fig. 6]
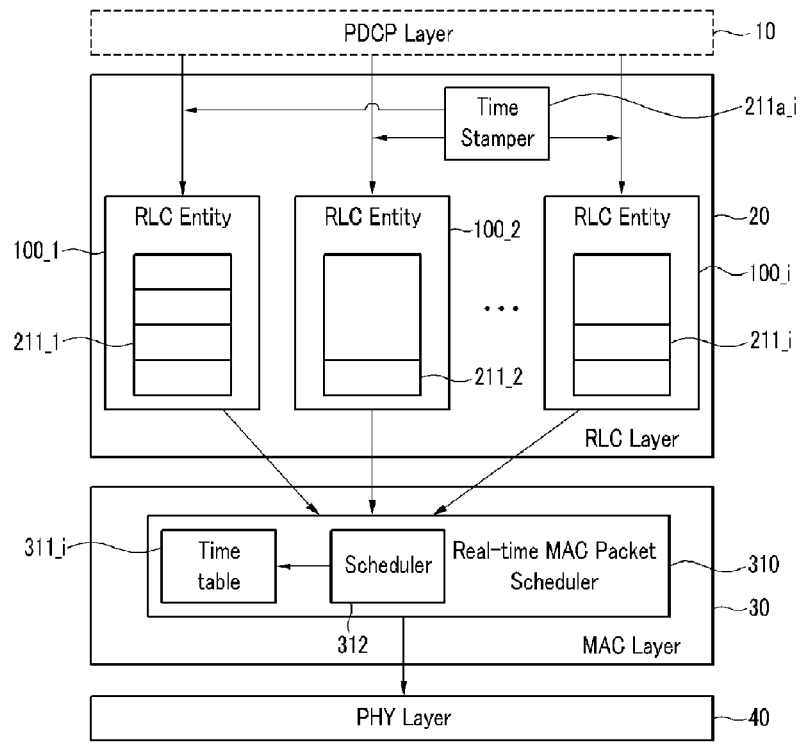
[Fig. 7]
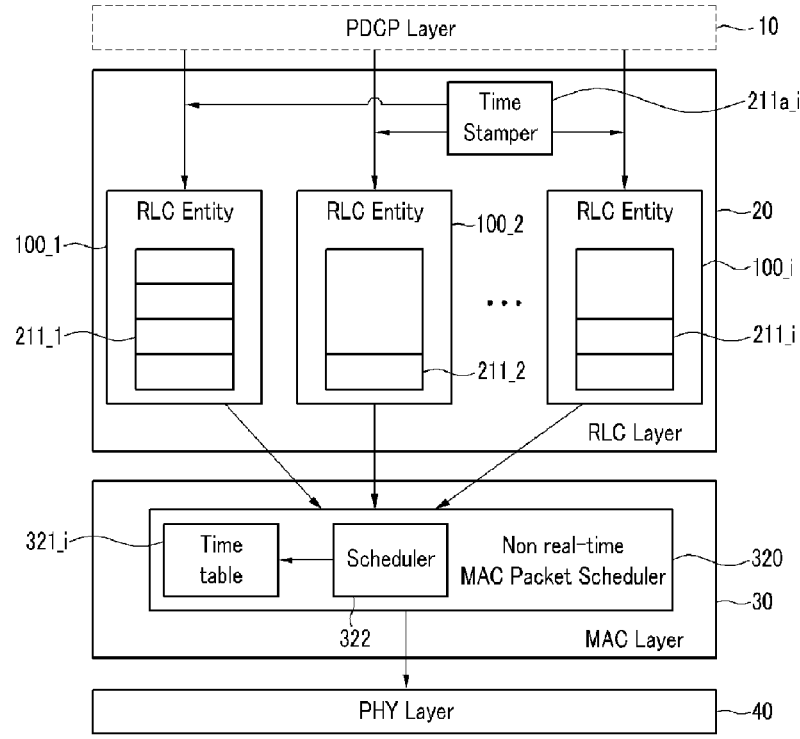

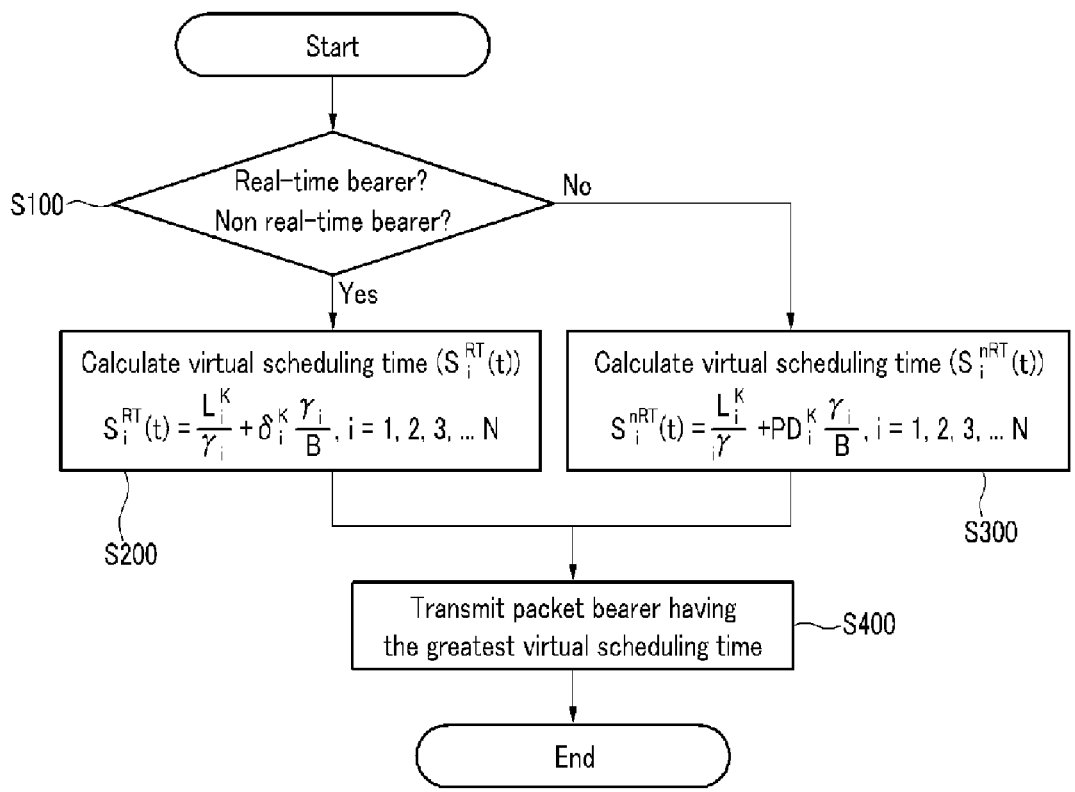
[Fig. 8]

PACKET SCHEDULER AND PACKET SCHEDULING METHOD

RELATED APPLICATIONS

This application is a 35 U.S.C. §371 national stage filing of PCT Application No. PCT/KR2007/006130 filed on Nov. 30, 2007, which claims priority to, and the benefit of, Korean Patent Application No. 10-2006-0120763 filed on Dec. 1, 2006 and Korean Patent Application No. 10-2007-0059839 filed on Jun. 19, 2007. The contents of the aforementioned applications are hereby incorporated by reference.

TECHNICAL FIELD

The present invention relates to a packet scheduler and a packet scheduling method in a communication system.

This work was supported by the IT R&D program of MIC/IITA[2005-S-404-22, Research and development on 3G long-term evolution access system].

BACKGROUND ART

Packetized types of various multimedia traffics are routed by a receiver side through an exchange network and transmitted in a communication system for a packet-based service. Therefore, a packet delay and a delay variation between packets are generated in the communication system. The phenomenon is a factor in deteriorating the quality of service (QoS) for a real-time service call and a non real-time service call of the required radio packet since the time when isochronous traffic arrives at the receiver side is not constant when the isochronous traffic, such as speech or images, is transmitted through a packet service, such as the Voice over Internet Protocol (VoIP), that is a real-time service. Hence, the receiver side needs to have a method for correcting the packet delay variation. Also, the receiver side needs to have a method for providing fair throughputs through correction of different delays caused by the QoS for the real-time service or the non real-time service that does not require isochronism.

That is, regarding the data transmission method of a radio traffic call in the conventional communication system is provided the real-time packet transmission service and non real-time packet transmission service that does not regard the packet delay time or packet delay variation. Therefore, since the conventional system provides unfair packet delay and packet delay variation, a service user problematically receives an inefficient service.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a packet scheduling method and a packet scheduler for correcting a packet delay time and a packet delay variation.

Technical Solution

In one aspect of the present invention, a method for scheduling a packet from a plurality of radio bearers by a scheduler of a first layer includes calculating a virtual scheduling time for each radio bearer by using a packet delay variation of the radio bearer, and transmitting a packet of the radio bearer having the greatest virtual scheduling time from among the plurality of radio bearers to a second layer. In another aspect of the present invention, a method for scheduling packets from a plurality of radio bearers by a scheduler of a first layer includes calculating a virtual scheduling time for the respective radio bearers by using a packet delay time of the radio bearers, and transmitting the packet of the radio bearer having the greatest virtual scheduling time from among the plurality of radio bearers to a second layer in advance. In another aspect of the present invention, a packet scheduler includes: a plurality of queues corresponding to a plurality of radio bearers; and a scheduler for calculating a virtual scheduling time for the radio bearers based on an arrival time when a random packet for a radio bearer is received to a corresponding queue and a departure time when the packet is transmitted to a lower layer from the corresponding queue, and scheduling the packets of the plurality of radio bearers based on the virtual scheduling time.

Advantageous Effects

According to the exemplary embodiments of the present invention, system resource of the radio traffic and a fair data rate of the wired and radio resources are satisfied by applying fair traffic transmission using the packet delay and packet delay variation according to the QoS for the real-time service call and the non real-time service call of the radio packet. Therefore, fair and reliable services are provided to increase the user's satisfaction by controlling the mobile phone service users to receive the real-time traffic with less delay and to control the distribution characteristics of the packet delay variation to maintain the isochronism.

BRIEF DESCRIPTION OF THE DRAWINGS

FIG. 1 shows a radio access protocol of a communication system according to a first exemplary embodiment of the present invention.

FIG. 2 shows a real-time RLC packet scheduler according to a first exemplary embodiment of the present invention.

FIG. 3 shows a packet delay variation distribution map for the radio traffic packet according to a first exemplary embodiment of the present invention.

FIG. 4 shows a non real-time RLC packet scheduler according to a first exemplary embodiment of the present invention.

FIG. 5 shows a radio access protocol of a communication system according to a second exemplary embodiment of the present invention.

FIG. 6 shows a real-time MAC packet scheduler according to a second exemplary embodiment of the present invention.

FIG. 7 shows a non real-time MAC packet scheduler according to a second exemplary embodiment of the present invention.

FIG. 8 shows a flowchart for a packet scheduling method in a communication system according to a third exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, unless explicitly described to the contrary, the word "comprising", and variations such as "comprises", will be understood to imply the inclusion of stated elements but not the exclusion of any other elements. Also, the terms unit, device, and module in the present specification represent a unit for processing a predetermined function or operation, which can be realized by hardware, software, or a combination of hardware and software.

A packet scheduler and a packet scheduling method in a communication system according to exemplary embodiments of the present invention will now be described with reference to the accompanying drawings.

FIG. 1 shows a radio access protocol of a communication system according to a first exemplary embodiment of the present invention.

As shown in FIG. 1, the radio access protocol includes a packet data convergence protocol (PDCP) layer 10, a radio link control (RLC) layer 20, a medium access control (MAC) layer 30, and a physical (PHY) layer 40. Here, the PDCP, RLC, and MAC layers 10, 20, and 30 form a second layer of the radio access protocol for a matching status between a terminal and a core network.

The PDCP layer 10 is used in the packet exchange area, and is a layer for compressing a header of upper packet data and transmitting the compressed header so as to increase transmission efficiency of the packet data of a radio channel.

The RLC layer 20 is provided on the MAC layer 30, supports reliable data transmission, and divides and connects RLC service data units (SDUs) transmitted from an upper layer so as to configure data that satisfies the size of the radio section. In this instance, the RLC SDUs are divided into RLC protocol data units (PDUs), and it is allowed to generate PDUs by combining the RLC SDUs. The RLC layer 20 supports the data recombine function so as to restore the existing RLC SDUs from the received RLS PDUs, and transmits the RLS PDUs which requested by MAC layer 30 to the MAC layer 30. In this instance, RLC PDUs is in the division format of RLC SDUs packets or in the combination of RLC SDUs packets.

The RLC layer 20 includes a plurality of RLC entities (100_1-100_i) and an RLC packet scheduler 200, and retransmits data to a radio link by using the automatic repeat request (ARQ) function. Here, the RLC entities (100_-100_i) correspond to radio bearers.

The RLC entities (100_1-100_i) are operable by the transparent mode (TM), the unacknowledged mode (UM), and the acknowledged mode (AM) according to the RLC SDU processing and transmitting methods. The RLC entities (100_1-100_i) respectively include a buffer for the radio bearer corresponding to each RLC entity.

The RLC packet scheduler 200 includes a real-time RLC packet scheduler 210 and a non real-time RLC packet scheduler 220. The real-time RLC packet scheduler 210 processes the real-time radio traffic bearer. The non real-time RLC packet scheduler 220 processes the non real-time radio traffic bearer. Particularly, the real-time RLC packet scheduler 210 in the RLC layer 20 has a priority greater than that of the non real-time RLC packet scheduler 220 and transmits the data to the MAC layer 30 according to the priority.

The MAC layer 30 selects an appropriate transmission channel and adds desired control information so as to transmit the data transmitted by the RLC layer 20. Also, the MAC layer 30 selects the protocol data unit (PDU) size for a predetermined transmission timing interval (TTI) and requests a RLC PDU from the RLC layer 20.

In the second layer of the communication system according to the exemplary embodiment of the present invention, the respective protocol layers can be formed in the same subsystem or can be distributed in different subsystems depending on the characteristics and functions of the communication system.

A method for processing a real-time radio bearer in the real-time RLC packet scheduler 210 according to the first exemplary embodiment of the present invention will now be described referring to FIG. 2.

FIG. 2 shows a real-time RLC packet scheduler 210 according to a first exemplary embodiment of the present invention.

The real-time RLC packet scheduler 210 includes a time table (212a_i) and a scheduler 212.

A plurality of RLC entities (100_1-100_i) include a plurality of queues (211_1-211_i).

The number of queues (211_1-211_i) corresponds to the number of radio bearers, and the queues store information and RLC packets transmitted from the RLC entities (100_1-100_i). In this instance, the queues (211_1-211_i) use the first-in first-out (FIFO) method.

For ease of description, FIG. 2 shows a time stamper 211a_i corresponding to the i-th queue 211_i from among a plurality of time stampers. Also, FIG. 2 shows a time table 212a_i corresponding to the i-th queue 211_i from among a plurality of time tables.

A method for processing the real-time radio traffic bearer in the RLC layer 20 with reference to the i-th radio bearer will now be described. Residual radio bearers other than the i-th radio bearer can be processed in a like manner of the i-th radio bearer.

The time stamper 211a_i records arrival times of the RLC packets received at the queues (211_1-211_i) corresponding to the respective time stampers, and the time table 212a_i records a departure time of the packet transmitted to the MAC layer 30 from the queue 211_i through the scheduler 212. In this instance, a packet delay time $(PD_i^k)$ for the k-th stored packet for the RLC packet within the i-th queue 211_i corresponding to the i-th RLC entity 100_i at a predetermined time t is expressed by Equation 1.

$$PD_i^k = d_i^k - a_i^k \quad \text{(Equation 1)}$$

Here, $a_i^k$ is the arrival time when the k-th packet arrives at the queue 211_i, and $d_i^k$ is the departure time of the k-th packet transmitted to the MAC layer 30 from the queue 211_i by the scheduler 212.

Also, the packet delay variation time $(\sigma_i^k)$ for the packet is expressed by Equation 2.

$$\sigma_i^k = PD_i^k - PD_i^{k-1} \quad \text{(Equation 2)}$$

Here, i is an integer from 1 to N.

Equation 2 can be expressed as Equation 3 from Equation 1.

$$\sigma_i^k = (d_i^k - a_i^k) - (d_i^{k-1} - a_i^{k-1}) \quad \text{(Equation 3)}$$

Here, i is an integer from 1 to N.

As expressed in Equation 3, the delay variation ($\sigma_i^k$) of the k-th RLC packet for the i-th radio bearer transmitted to the MAC layer 30 is a time that is generated by subtracting a delay time that is generated by subtracting the queue arrival time ($a_i^{k-1}$) of the (k−1)th packet from the departure time ($d_i^{k-1}$) of the transmitted (k−1)th packet from a delay time that is generated by subtracting the queue arrival time ($a_i^k$) of the k-th packet from the departure time ($d_i^k$) of the k-th packet.

The packet delay variation ($\sigma_i^k$) may have three states. The case in which the packet delay variation ($\sigma_i^k$) is less than 0 indicates an preceded state, and the case in which the packet delay variation ($\sigma_i^k$) is greater than 0 indicates a deferred state. The above-noted preceded or deferred state is called traffic jam, that is, traffic congestion. In the traffic jam state, the time for transmitting the packet to the MAC layer 30 by the scheduler 212 is delayed and the service time is delayed. However, the packet for the case in which the packet delay variation ($\sigma_i^k$) is 0 indicates a transmitted state, that is the state in which packet transmission satisfies the real-time traffic's isochronism. And we say that the k-th packet for the i-th radio bearer is perfectly guaranteed for packet delay variation (PDV).

In general, packet delay variation for the transmitted packets can have the distribution shown in FIG. 3. When all the radio packets in the radio link are located at the place with the packet delay variation of 0, the packet transmission satisfies isochronism in an ideal manner. However, although it is difficult for the packets in the radio link to satisfy the same isochronism, the packet near 0 has the best transmission characteristics.

Also, when the packet transmission satisfies the isochronism and the transmission throughput of all the radio bearers is normalized to the data rate of the entire radio links, fair throughput can be provided according to the data rate.

To achieve this, the real-time RLC packet scheduler 210 for the packet scheduling method in the RLC layer 20 according to the exemplary embodiment of the present invention calculates the virtual scheduling time ($S_i^{RT}(t)$) by using the packet delay variation ($\sigma_i^k$) for the random packet of the i-th radio bearer as expressed by Equation 4 and controls transmission between the radio bearers by using the virtual scheduling time ($S_i^{RT}(t)$).

Also, $r_i$ is the data rate of the i-th radio bearer, $L_i^k$ is the length of the k-th packet, B is the sum of the data rates of all the established radio bearers, and $\sigma_i^k$ is the packet delay variation of the k-th packet.

As given by Equation 4, the scheduler 212 multiplies the packet delay variation ($\sigma_i^k$) by the data rate ($r_i$) of the i-th radio bearer for the sum B of the data rate of all the radio bearers, adds the ratio of the length ($L_i^k$) of the k-th packet for the data rate ($r_i$) of the i-th radio bearer thereto, and determines the virtual scheduling time ($S_i^{RT}(t)$) for the i-th radio bearer. Therefore, the virtual scheduling time ($S_i^{RT}(t)$) is a virtual time index for indicating the degree of the packet delay variation normalized by the data rate of the corresponding radio bearer at a predetermined time.

The scheduler 212 calculates Equation 4 for each time in advance to transmit the packet of the bearer having the greatest virtual scheduling time ($S_i^{RT}(t)$) to the MAC layer 30 with a priority. By reducing the packet delay time and the packet delay variation, isochronism of real-time packet transmission for the real-time radio traffic packet is improved, and the transmission characteristic of fair throughputs for the bearer's data rate is acquired.

Next, a method for processing a non real-time radio bearer by the non real-time RLC packet scheduler 220 according to the first exemplary embodiment of the present invention will now be described referring to FIG. 4.

FIG. 4 shows a non real-time RLC packet scheduler 220 according to a first exemplary embodiment of the present invention.

A method for processing the non real-time radio traffic bearer with reference to the i-th radio bearer will now be described in a like manner of the method for processing the real-time radio bearer by the real-time RLC packet scheduler 210 shown in FIG. 2. Non real-time radio bearers other than the i-th non real-time radio bearer can be processed in a like manner of the i-th non real-time radio bearer.

When the packet arrives at the corresponding queue 211_i from the RLC entity 100_i, the time stamper 211a_i records the arrival time, and the time table 222a_i also records the departure time of the packet transmitted to the MAC layer 30 from the corresponding queue 211_i through the scheduler 222. In this instance, the packet delay time ($PD_i^k$) for the k-th packet for the RLC packet in the i-th queue 211_i at a time t can be expressed as Equation 1.

The non real-time RLC packet scheduler 220 calculates the virtual scheduling time ($S_i^{nRT}(t)$) by using the packet delay time ($PD_i^k$) for a random packet of the i-th radio bearer as expressed by Equation 5, and controls the transmission between the radio bearers by using the virtual scheduling time ($S_i^{nRT}(t)$).

$$S_i^{RT}(t) = \frac{L_i^k}{r_i} + \sigma_i^k \frac{r_i}{B} \quad \text{(Equation 4)}$$

Here, i is an integer between 1 and N.

$$S_i^{nRT}(t) = \frac{L_i^k}{r_i} + PD_i^k \frac{r_i}{B} \quad \text{(Equation 5)}$$

Here, i is an integer between 1 and N.

Also, $r_i$ is the data rate of the i-th radio bearer,
$L_i^k$
is the length of the k-th packet, B is the sum of data rates of all the established radio bearers, and
$PD_i^k$
is the packet delay time of the k-th packet.

Therefore, the virtual scheduling time
$(S_i^{nRT}(t))$
is a virtual delay time index for indicating the degree of the packet delay variation normalized by the scheduler 222 by the data rate of the corresponding radio bearer at a predetermined time.

The scheduler 222 calculates Equation 5 for each time in advance to transmit the packet of the bearer having the greatest virtual scheduling time
$(S_i^{nRT}(t))$
to the MAC layer 30 with a priority.

By reducing the packet delay time, the fair throughput for the bearer's data rate is provided to acquire efficient QoS characteristics for the radio packet's real-time service call and non real-time service call.

FIG. 5 shows a radio access protocol of a communication system according to a second exemplary embodiment of the present invention.

As shown in FIG. 5, the radio access protocol of the communication system corresponds to that described with reference to FIG. 1, and differing from this, the MAC layer 30 includes a MAC packet scheduler 300.

The MAC layer 30 includes the MAC packet scheduler 300, and transmits data in the radio link through the hybrid automatic repeat request (HARQ) function.

The MAC packet scheduler 300 includes a real-time MAC packet scheduler 310 and a non real-time MAC packet scheduler 320. The real-time MAC packet scheduler 310 processes the real-time radio traffic bearer. The non real-time MAC packet scheduler 320 processes the non real-time radio traffic bearer. Particularly, in the MAC layer 30, the real-time MAC packet scheduler 310 has a priority in advance to that of the non real-time MAC packet scheduler 320 and transmits data to the PHY layer 40 according to the priority.

A method for processing the real-time radio bearer by the real-time MAC packet scheduler 310 according to the second exemplary embodiment of the present invention will now be described referring to FIG. 6.

FIG. 6 shows a real-time MAC packet scheduler according to a second exemplary embodiment of the present invention.

The real-time MAC packet scheduler 310 includes a plurality of timetables and a scheduler 312. For ease of description, FIG. 6 shows a timetable 311_i corresponding to the i-th queue 211_i from among the plurality of timetables.

The plurality of timetables have the same number as that of the radio bearers, and record the departure time of the data transmitted to the PHY layer 40 by the scheduler 312.

The method for processing the real-time radio traffic bearer by the MAC layer 30 with reference to the i-th radio bearer corresponds to the method for processing the real-time radio traffic bearer by the RLC layer 20 with reference to the i-th radio bearer shown in FIG. 2. In this instance, it is assumed that the time stamper 211a_i of the RLC layer 20 includes the reference time that is synchronized in the timetable 311_i of the MAC layer 30.

A method for processing the non real-time radio bearer by the non real-time MAC packet scheduler 320 according to the second exemplary embodiment of the present invention will now be described referring to FIG. 7.

FIG. 7 shows a non real-time MAC packet scheduler 320 according to a second exemplary embodiment of the present invention.

The non real-time MAC packet scheduler 320 includes a plurality of timetables and a scheduler 322. For ease of description, FIG. 7 shows a timetable 321_i corresponding to the i-th queue 211_i from among the plurality of timetables.

The method for processing the non real-time radio traffic bearer by the MAC layer 30 with reference to the i-th radio bearer corresponds to the method for processing the non real-time radio traffic bearer in the RLC layer 20 with reference to the i-th radio bearer shown in FIG. 3.

FIG. 8 shows a flowchart for a packet scheduling method in a communication system according to a third exemplary embodiment of the present invention.

The RLC packet scheduler 200 of the RLC layer 20 determines whether the bearer is a real-time bearer or a non real-time bearer (S100). When the bearer is found to be a real-time bearer, the RLC packet scheduler 200 calculates the virtual scheduling time
$(S_i^{RT}(t))$
by using Equation 4 (S200). When the bearer is found to be a non real-time bearer, the RLC packet scheduler 200 calculates the virtual scheduling time
$(S_i^{nRT}(t))$
by using Equation 5 (S300). The RLC packet scheduler 200 transmits the packet of the bearer having the greatest virtual scheduling time to the MAC layer 30 by using the virtual scheduling time calculated in S200 or S300 (S400).

The packet scheduling method according to the exemplary embodiment of the present invention is not limited to the case in which the RLC layer 20 includes the RLC packet scheduler 200 but the MAC layer 30 can include the MAC packet scheduler 300.

The packet scheduling method can be realized in consideration of the characteristics of the system in the RLC layer 20 or the MAC layer 30.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for scheduling a packet from a plurality of radio bearers by a scheduler of a first layer, the method comprising:
    calculating a virtual scheduling time for each radio bearer by using a packet delay variation of the radio bearers; and
    transmitting a packet of the radio bearer having the greatest virtual scheduling time from among the plurality of radio bearers to a second layer.

2. The method of claim 1, wherein
    the first layer includes a radio link control (RLC) layer, and the second layer includes a medium access control (MAC) layer.

3. The method of claim 1, wherein
the first layer includes a medium access control (MAC) layer, and the second layer includes a physical (PHY) layer.

4. The method of claim 1, wherein
the plurality of radio bearers include real-time radio bearers.

5. The method of claim 1, wherein
the calculating of the virtual scheduling time includes calculating the virtual scheduling time by normalizing the packet delay variation.

6. The method of claim 5, wherein:
the packet delay variation is a value that is generated by subtracting the delay time of a second packet that is transmitted before a first packet is transmitted from the delay time of the first packet; and
the delay time of the first packet is a value that is generated by subtracting the arrival time of the first packet from the departure time of the first packet, and the delay time of the second packet is a value that is generated by subtracting the arrival time of the second packet from the departure time of the second packet.

7. The method of claim 5, wherein
the calculating of the virtual scheduling time includes calculating the virtual scheduling time by adding the ratio of the length of the packet for the data rate of each radio bearer and the product of the ratio of the data rate of each radio bearer for the sum of the data rates of the radio bearers and the packet delay variation.

8. A method for scheduling packets from a plurality of radio bearers by a scheduler of a first layer, the method comprising:
calculating a virtual scheduling time for respective radio bearers by using a packet delay time of the radio bearers; and
transmitting the packet of the radio bearer having the greatest virtual scheduling time from among the plurality of radio bearers to a second layer in advance.

9. The method of claim 8, wherein
the first layer is a radio link control (RLC) layer, and the second layer is a medium access control (MAC) layer.

10. The method of claim 8, wherein
the first layer is a medium access control (MAC) layer, and the second layer is a physical (PHY) layer.

11. The method of claim 8, wherein
the plurality of radio bearers include non real-time radio bearers.

12. The method of claim 8, wherein
the calculating of the virtual scheduling time includes calculating the virtual scheduling time by normalizing the packet delay time.

13. The method of claim 12, wherein
the packet delay time is a value that is generated by subtracting the arrival time of a random packet from the departure time of the random packet.

14. The method of claim 13, wherein
the calculating of the virtual scheduling time includes calculating the virtual scheduling time by adding the ratio of the length of the packet for the data rate of each radio bearer and the product of the ratio of the data rate of each radio bearer for the sum of the data rates of the radio bearers and a packet delay time.

15. A packet scheduler comprising:
a plurality of queues corresponding to a plurality of radio bearers; and
a scheduler for calculating a virtual scheduling time for a radio bearer based on an arrival time when a random packet for the radio bearer is received to a corresponding queue and a departure time when the packet is transmitted to a lower layer from the corresponding queue, and scheduling the packets of the plurality of radio bearers based on the virtual scheduling time.

16. The packet scheduler of claim 15, wherein
the scheduler transmits the packet of the radio bearer having the greatest virtual scheduling time from among the plurality of radio bearers to the lower layer.

17. The packet scheduler of claim 15, wherein
the plurality of radio bearers are real-time radio bearers, and
the scheduler includes a real-time scheduler for normalizing the packet delay variation of the radio bearers and calculating the virtual scheduling time.

18. The packet scheduler of claim 15, wherein:
the plurality of radio bearers are non real-time radio bearers; and
the scheduler includes a non real-time scheduler for normalizing the packet delay time of the radio bearers and calculating the virtual scheduling time.

* * * * *